United States Patent [19]

Newman et al.

[11] Patent Number: 4,828,643
[45] Date of Patent: May 9, 1989

[54] LIQUIFIED CELLULOSIC FIBER, RESIN BINDERS AND ARTICLES MANUFACTURED THEREWITH, AND METHOD OF MANUFACTURING SAME

[75] Inventors: William Newman; Michael E. Rakauskas, both of Elgin, Ill.

[73] Assignee: Masonite Corporation, Chicago, Ill.

[21] Appl. No.: 2,114

[22] Filed: Jan. 12, 1987

Related U.S. Application Data

[63] Continuation-in-part of Ser. No. 832,143, Feb. 19, 1986, abandoned, which is a continuation of Ser. No. 597,917, Apr. 9, 1984, abandoned.

[51] Int. Cl.$^4$ ................................................. C09J 3/02
[52] U.S. Cl. ..................................... 156/328; 156/335; 264/128; 428/326; 428/529; 527/105; 528/129; 536/56
[58] Field of Search ...................... 156/328, 335, 62.2; 264/128; 428/326, 529; 536/56; 527/105; 528/129; 127/34

[56] References Cited

U.S. PATENT DOCUMENTS 2,955,092 10/1960 Hudgin .................................. 156/62.2
3,704,199 11/1972 Smucker ............................... 156/335
4,169,077 9/1979 Hartman ............................... 428/529
4,226,982 10/1980 Blount .................................. 527/105

Primary Examiner—John J. Gallagher
Attorney, Agent, or Firm—Mason, Kolehmainen, Rathburn & Wyss

[57] ABSTRACT

A method of manufacturing a liquified fiber-phenol-formaldehyde resin includes heating a mixture of phenol, formaldehyde, liquified cellulosic fiber and alkali at a temperature of 60° C. to 100° C. and a pH of 8–13. The liquified cellulosic fiber comprises about 5 to about 80 percent of the total weight of phenol, formaldehyde and liquified fiber. Also disclosed are fibrous articles manufactured using this resin as a binder, such as fiberboards, particle board, plywood, oriented strand board, and waferboard.

48 Claims, 10 Drawing Sheets

LIQUIFIED CELLULOSIC FIBER, RESIN BINDERS AND ARTICLES MANUFACTURED THEREWITH, AND METHOD OF MANUFACTURING SAME

CROSS REFERENCE TO RELATED APPLICATION

This application is a continuation-in-part of copending application Ser. No. 832,143 filed Feb. 19, 1986, now abandoned which is continuation of Ser. No. 597,917, filed Apr. 9, 1984, now abandoned.

FIELD OF THE INVENTION

The present invention relates to a liquified cellulosic fiber and a method of manufacturing liquified cellulosic fibers, and particularly to a liquid cellulosic fiber-modified phenol-formaldehyde resin particularly useful as a binder in the formation of man-made boards and molded objects including fibers, fibrous particles and a plurality of uniformly, or randomly shaped pieces, masses or sheets bonded together with the liquid cellulosic fiber modified phenol-formaldehyde resin. More particularly, the present invention relates to a method of manufacturing a novel binding resin comprising phenol, formaldehyde, and about 30% to about 80% by weight liquified cellulosic fiber. The present invention also relates to a method of manufacturing fibrous objects, particle objects and other objects or sheet materials made by bonding together a plurality of uniformly or randomly shaped masses, for example fiberboards, such as hardboard and insulation board; particle board; plywood; oriented strand board; and waferboard, using this novel resin binder and to the method of manufacturing these articles.

BACKGROUND OF THE INVENTION AND PRIOR ART

Synthetic resin binders, such as phenolformaldehyde, added in the manufacture of fiberboard, such as hardboard and particle board, or used to bond adjacent, e.g. fibrous, material parts such as in the manufacture of plywood, oriented strand board and waferboard, represent a substantial portion of the cost of manufacture. Many attempts have been made to substitute all or a portion of such synthetic resin binders with less expensive components. For example, attempts have been made to utilize lignin-containing spent digestion liquors to form binding resins capable of bonding fibers and fibrous particles in the formation of a fiberboard, as set forth in U.S. Pat. Nos. 2,849,314 and 3,095,392. As set forth in the Guss U.S. Pat. No. 2,849,314, in spite of the many processes proposed for obtaining resinous compositions from sulfite liquor, for the most part such products have found little or no commercial application as thermosetting impregnating agents, binders or adhesives and particularly in the field of production of improved cellulosic and other fibrous materials.

Cellulosic fibers, in the form of comminuted wood, have been treated with caustic for the purpose of making wood pulp for papermaking, rayon, cellophane and the like. However, in each case, the prior art caustic treatment of cellulosic fibers did not result in fiber liquification, since it was desired to preserve the integrity of the cellulose to the greatest degree possible for subsequent use. The following patents teach alkali treatment of cellulosic fibers while maintaining fiber integrity: U.S. Pat. Nos. 1,169,592; 3,871,951; 41,538; 931,606; 2,701,255; 3,013,933; 2,999,783; 2,686,210; 817,960; 1,081,276; 781,733; 774,135; 1,266,957; 3,397,109; 2,541,058; 2,801,264; 2,926,114; 2,697,701; 2,697,702 and 2,697,703.

The Blount U.S. Pat. No. 4,226,982 discloses a method of liquifying cellulose fibers at atmospheric pressure using solid caustic flakes.

In accordance with the Herrick U.S. Pat. No. 3,095,392, a lignosulfonate is added to a reacted mixture of phenol and formaldehyde to form a modified phenol-formaldehyde resin for use as a fluid loss control agent in drilling muds and portland cement slurries.

In accordance with the principles of the present invention, it has been found that new and unexpected results are achieved in the formation of a liquified cellulosic fiber-modified phenol-formaldehyde resin wherein the liquified cellulosic fibers are prepared by heating a mixture of cellulosic fibers in an alkali solution having an alkali concentration of at least 2% by weight at a temperature of at least 140° C. and a pressure of at least 150 psi, wherein the weight ratio of alkali solution to cellulosic fibers is at least 4:1, for a time sufficient to liquify cellulosic fibers.

SUMMARY OF THE INVENTION

In brief, the present invention is directed to liquifying cellulosic fibers with caustic, for example sodium hydroxide, and using the liquified cellulosic fibers, in caustic solution, particularly aqueous solution, to manufacture modified phenolformaldehyde resins by substituting a portion of the phenol with the liquified cellulosic fiber. Since cellulosic fibers in waste form, such as sawdust, wood scrap, and sludge are common by-products of many pulping, man-made board, plywood, and lumber mill operations, it is economically desirable to substitute the liquified cellulosic fiber for phenol to provide the liquified fiber-phenol-formaldehyde resins of the present invention.

In accordance with one important embodiment of the present invention, a man-made board manufacturing waste by-product called "sludge" is useful as a cellulosic fiber source in the manufacture of liquified fiber. In the manufacture of cellulosic manmade, consolidated products such as hardboard and the like, wood chips are steam exploded and fiberized resulting in (1) very wet, discrete fibers or fibrous masses used to form the cellulosic man-made products; (2) a water soluble complex of phenolic and carbohydrate components as described in this assignee's U.S. Pat. No. 4,433,126; and (3) small solids forming part of the forming water which are filtered out of the water to form the "sludge". The "sludge" or fine solids component resulting from steam digestion and refining of wood chips when filtered is very wet, containing some of the water soluble complex of phenolic and carbohydrate components described in U.S. Pat. No. 4,433,126. Analysis of the sludge shows that it contains about 40% to about 60% lignin; about 1-2% wax; about 3-4% metals and about 40% to about 60% fine cellulosic wood particles undesirable as, and too fine to form part of a "man-made board. These fine solids, forming the sludge, pass through the forming wire supporting the man-made board during manufacture and are filtered out of the forming water and collected as a wet "sludge". The cellulosic fiber content of the sludge can be liquified in accordance with one important embodiment of the present invention to form the modified phenol-formaldehyde resins of the present invention.

In accordance with another important feature of the present invention, the liquified cellulosic fiber-modified phenol-formaldehyde resin of the present invention can be used to bind fibers, fibrous particles, and uniformly or randomly shaped masses in the production of fiberboard and other fibrous articles, such as hardboard; insulation board; fiberglass mats; lamination of sheet materials, such as in the manufacture of plywood; and in bonding together a plurality of discrete, uniformly or randomly shaped members, particularly fibrous members, such as in the manufacture of oriented strand board and waferboard, to provide new and unexpected strength, water resistance and dimensional stability.

Generally, in the manufacture of a phenolformaldehyde resin, one mole of phenol is reacted with two moles of formaldehyde. In accordance with the principles of the present invention, five to eighty percent by weight of this phenol can be substituted with a liquified cellulosic fiber and the mixture heated to form the liquified cellulosic fiber-phenolformaldehyde resins of the present invention. Heating generally is carried out at a temperature of 60°–100° C. for a period of 1–5 hours to achieve the liquified cellulosic fiber-phenol-formaldehyde resin of the present invention. In accordance with an important feature of the present invention, the cellulosic fibers are liquified at a temperature of at least 100° C. and above atmospheric pressure (a positive gauge pressure). It has been found that the ratio of caustic solution or digestion liquor (caustic dissolved in solvent, particularly where the solvent is water) to fiber is important to achieve a high degree of fiber liquification and liquified fiber reactivity. To achieve sufficient fiber liquification and digestion and so that the resulting liquid is sufficiently reactive in the formation of a liquified fiber-phenolformaldehyde resin, the weight ratio of liquor (caustic solution, and particularly an aqueous caustic solution) to cellulosic fiber should be at least 3 to 1 with a caustic (100% basis) concentration of at least 2% by weight of the liquor. To achieve the full advantage of the present invention, the weight ratio of caustic solution to cellulosic fiber should be at least 5 to 1 with best results achieved at a weight ratio of aqueous caustic solution to cellulosic fiber of at least 7 to 1, as shown in FIG. 1. There does not appear to be an upper limit for the caustic concentration in order to achieve sufficient fiber liquification and reactivity, but concentrations of caustic in the solution greater than about 15% by weight of the caustic solution or digestion liquor yield no improved results. To achieve the full advantage of the present invention, therefore, the caustic concentration (100% caustic basis) should be about 2% to about 15% by weight of the caustic solution, and especially caustic concentrations of at least 10% by weight, and especially about 10% to 15% by weight caustic, as shown in FIG. 2.

The greatest degree of fiber liquification occurs at a caustic solution to cellulosic fiber ratio of about 7:1 as seen in FIG. 1 at a weight ratio of caustic (100% basis) to cellulosic fiber (dry basis) of at least 0.4:1. To achieve the full advantage of the present invention, the weight ratio of caustic (100% basis) to cellulosic fibers (dry basis) should be 0.5–1 2:1. Greater weight ratios of caustic (100% basis) to cellulosic fibers can be used effectively with no improvement in results so long as the caustic is in solution, aqueous or other solution.

DETAILED DESCRIPTION OF THE PRESENT INVENTION LIQUIFICATION OF CELLULOSIC FIBERS

Figure 1:
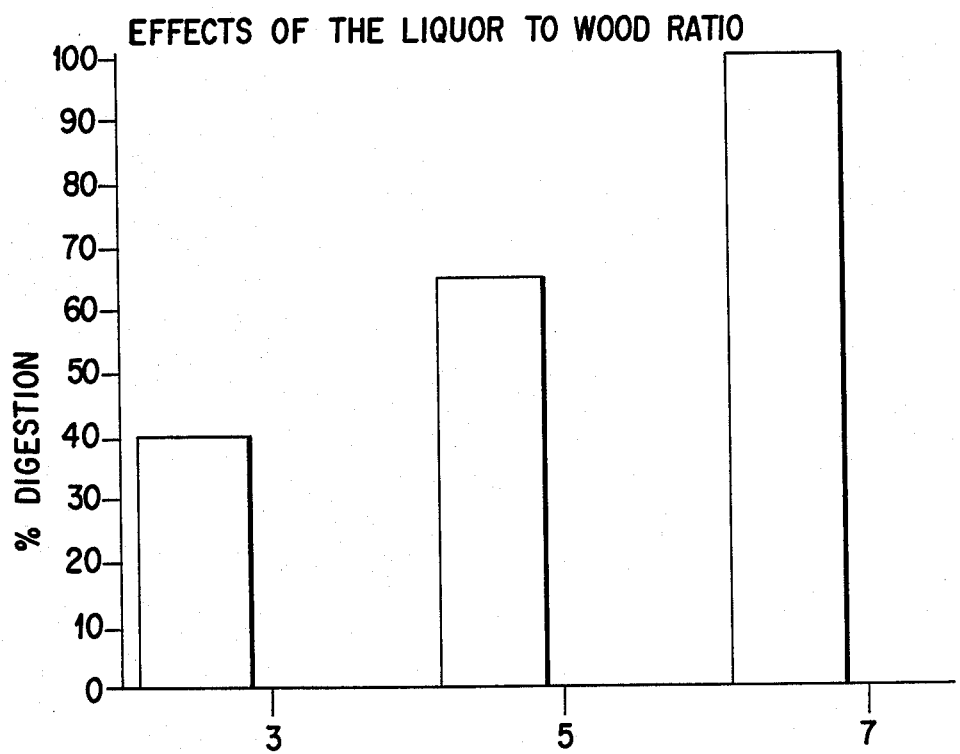
FIG. 1 is a graph showing the effects of various alkali solution (liquor) to cellulosic fiber weight ratios on the percentage of cellulosic fibers digested (liquified)
Figure 2:
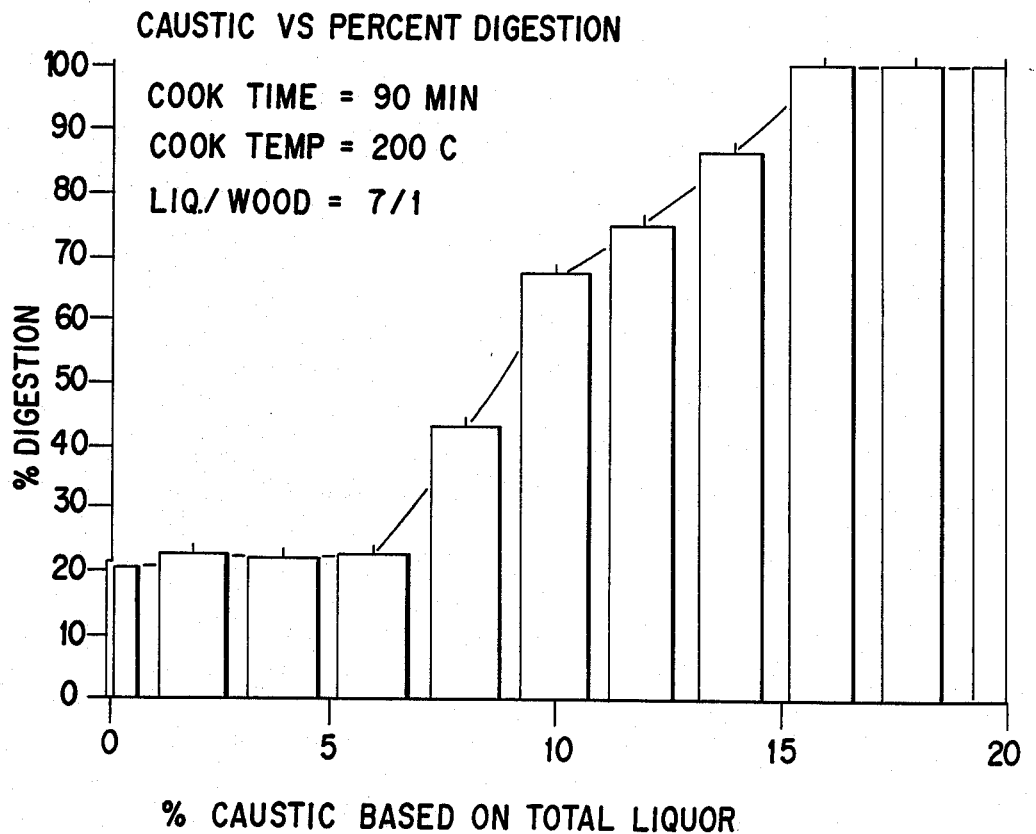
FIG. 2 is a graph showing the effects of various alkali concentrations in the alkali solution on the percentage of cellulosic fibers digested at a digestion temperature of 200° C. and an alkali solution to cellulosic fiber ratio of 7:1.

Cellulosic fibers are liquified in accordance with the present invention by contacting the fibers with alkali at an elevated temperature and pressure. The temperatures and pressures can vary considerably while achieving fiber liquification. Particularly suitable conditions for fiber liquification are temperatures of about 140° C. to about 220° C. and pressures of about 150 psig to about 350 psig using a 10%–15% by weight caustic, e.g. aqueous NaOH solution at a weight ratio of aqueous caustic solution (10%–15% by weight) to cellulosic fibers in the range of 4:1 to 12:1. At temperatures substantially above 200° C., there is a chance of charring the cellulosic fibers so that particularly suitable liquification temperatures are 140° C. to 200° C. Under these conditions least about 95% of the cellulosic fibers will liquify within about 30 minutes. Lower temperatures can be utilized to achieve cellulosic fiber liquification with higher pressures and/or increased caustic and/or increased contact times. To achieve the full advantage of the present invention, the caustic solution to cellulosic fiber weight ratio should be in the range of about 5:1 to 9:1 and especially 7:1, (based on a caustic solution having at least 2% and particularly 2% to 15% by weight caustic concentration, and preferably 15% by weight caustic); the temperature utilized should be about 150°–200° C. at a pressure of about 150–290 psig. The resulting liquified fiber can be filtered from any remaining solids and utilized as a direct replacement for phenol in the phenol-formaldehyde resin formulation.

In order to show the importance of the caustic solution to cellulosic fiber ratio of at least 4 to 1 and especially 5 to 1 and 7 to 1, and using above atmospheric pressure, as opposed to solid caustic (lye flakes) at atmospheric pressure as disclosed in the prior art Blount U.S. Pat. No. 4,226,982, cellulosic fibers were digested, used to make resin and the resin used as a binder (1) in accordance with the present invention and (2) according to Blount U.S. Pat. No. 4,226,982. The digestions and preparation of the resins were performed in accordance with the following Table I:

TABLE I

DIGESTION CONDITIONS

Starting Material: Waste fiber from a hardboard manufacturing mill.
Particle size:
10% Sawdust fines
20% Wood chips and splinters
70% fiber
Particle Moisture Content: 50–60%
Digestion Conditions: Reaction temperature, time and percent caustic were based on the Blount conditions.
Temperature: 200° C.
Time: 90 Minutes
Caustic: Equal parts dry wood and caustic
Pressure:
Masonite: 250 psig
Blount: 0 psig
Actual Charges:

|  | Masonite | Blount |
| --- | --- | --- |
| Wood: (Dry) | 100 g | 100 g |
| Caustic: | 100 g (100% caustic basis) | 100 g lye flakes |
| Water: | Masonite | Blount |
| (in wet wood) | 150 g | 0 |
| (additional) | 550 g | 0 |
| (total) | 700 g | 0 |

RESIN COOK CONDITIONS
Formaldehyde/Phenol molar ratio 3/1
Catalyst (NaOH)/Phenol molar ratio 0.5/1
% Replacement of phenol 35
Actual Resin Charge:

|  | Masonite | Blount |
| --- | --- | --- |
| Phenol (90%) | 104 g | 104 g |
| Formaldehyde (37%) | 243 g | 243 g |
| Catalyst (NaOH 50%) | 40 g | 40 g |
| Water soluble digested material (50% solids) | 101 g | 101 g |

Procedure:
Charge reactor except for catalyst
Heat to 50° C.
Slowly add NaOH catalyst
Heat to 95° C.
Hold temperature under reflux until viscosity reaches 125 cps

TABLE I-continued

Cool

Figure 3:
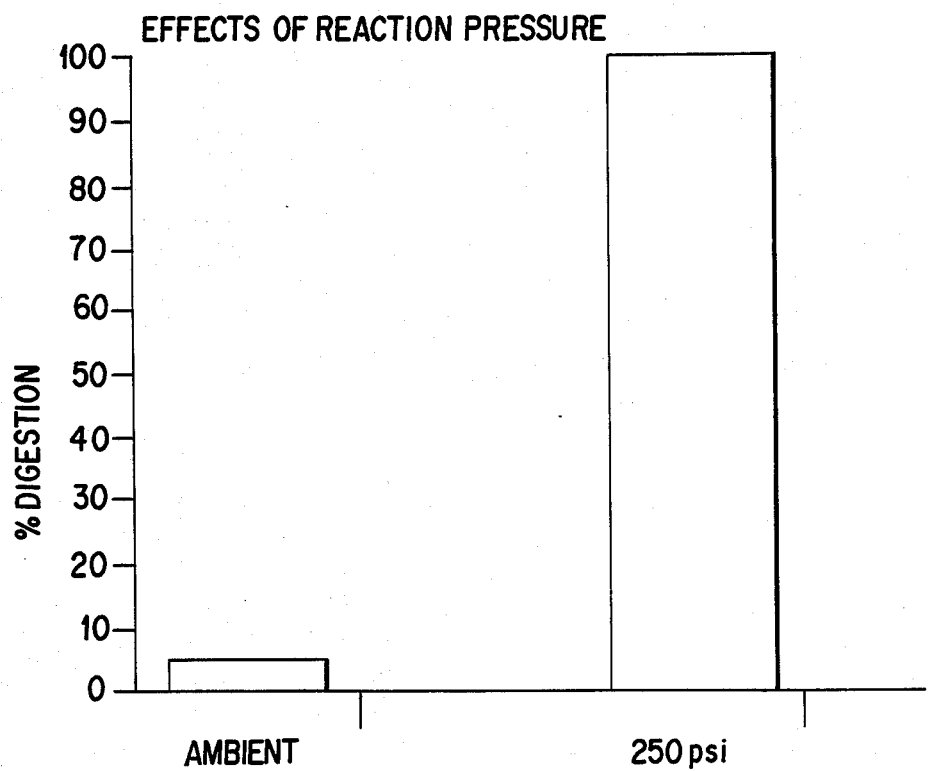
FIG. 3 is a graph showing unexpectedly increased digestion at a cellulosic fiber heating pressure of 250 psi compared to ambient (atmospheric) pressure.

The liquid obtained from the Blount patent process, as described in Table I, was, at most, 30% water soluble at 200° C., and the water solubility decreased with cooling. Only the water soluble material has utility for the manufacture of a resin in a commercially viable manner. The percent of digested material at ambient (prevailing atmospheric) pressure compared to digestion at a pressure of 250 psi gauge is dramatically illustrated in FIG. 3.

Figure 5:
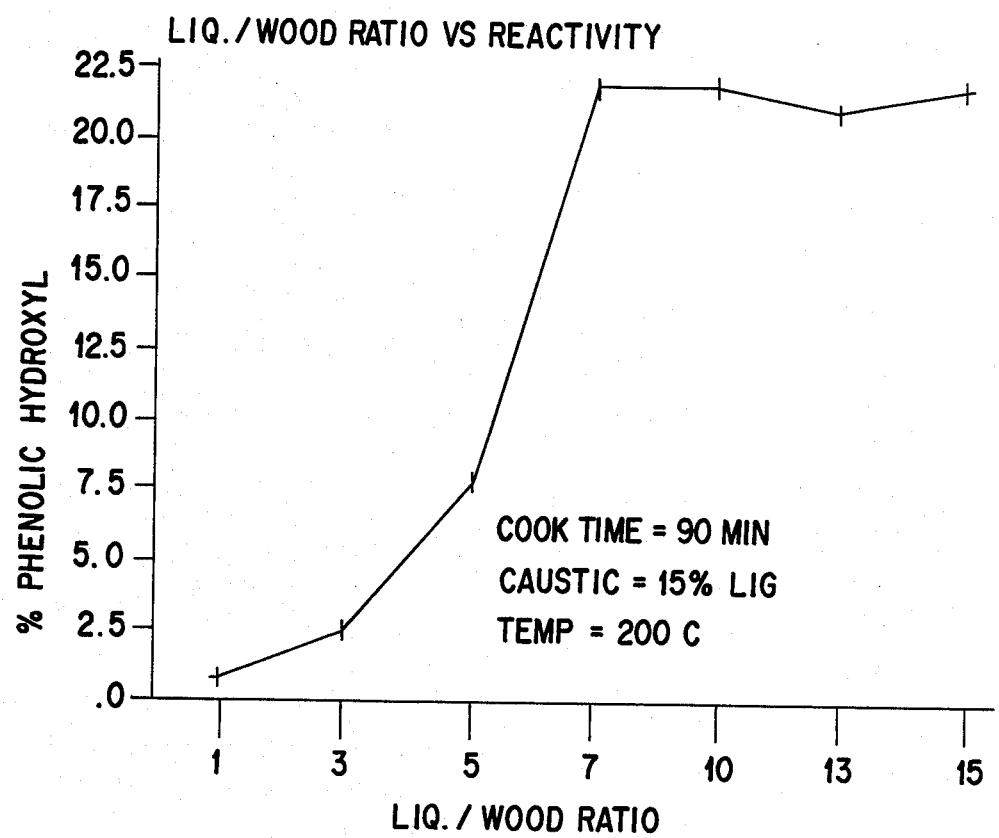
FIG. 5 is a graph showing the effects of various alkali solution to cellulosic fiber (liquor/wood) ratios on the reactivity (% phenolic hydroxyl) of the resulting liquified cellulosic fibers.

The liquified cellulosic fibers digested in accordance with the process disclosed herein and the liquified cellulosic fibers digested in accordance with the Blount U.S. Pat. No. 4,226,982 (Table I) were analyzed by gas chromotography to determine the phenolic hydroxyl content of each. The phenolic hydroxyl content of a liquified cellulosic fiber is a key factor in the incorporation of the liquified cellulosic fiber into the resin - the/-greater the phenolic hydroxyl content, the greater the potential for incorporation into the resin. The liquified cellulosic fibers made by the process of the present invention were found to have a phenolic hydroxyl content of 10% to 20+% (FIG. 5 compared to a 5% phenolic hydroxyl content of the liquified cellulosic fibers made in accordance with the Blount U.S. Pat. No. 4,226,982. The procedure for determining the phenolic hydroxyl content is set forth in Table II:

TABLE II

Weigh into vial 10 mg sample of liquified cellulosic fiber.
add 10 mg adipic acid
add 0.25 ml 57% Hl
add 2 ml internal standard(*)
Cap immediately and weigh. Make sure can is sealed.
Insert vial into preheated block at 140° C.
Let sample react at temperature for 60 minutes.
Mix sample on vortex stirrer every ten minutes.
Remove sample and cool to room temperature.
Inject 0.5 microliters to gas chromotograph GC (*).
(*) Internal standard: 100 microliters n-propyl iodide in 10 ml Fisher Certified Xylene.
(**) GC equipped with a 9 ft. 10%SP1000,1%$H_3PO_4$-100-120-chromosorb column. Program GC to run at 45° C. for 11 minutes, increase at the rate of 25° C. per minute to 200° C., and hold at 200° C. for 2 minutes and return to start.
Compare internal standard peak area to a pure ethyl peak area.
Et peak area/Et density
n-propyl peak area/n-propyl density
Dividing the two will give a standard ratio of n-propyl to Ethyl.
Since the exact amount of n-propyl internal standard added to each sample is known, the standard ratio, the sample n-propyl peak area, and the sample ethyl peak area can be ratioed to determine the exact amount of Ethyl present. Divided by the sample weight, a percent ethyl can be determined. Phenolic hydroxyl can then be determined by the equation: % Ethyl 0.3778 = % phenolic hydroxyl.

Figure 4:
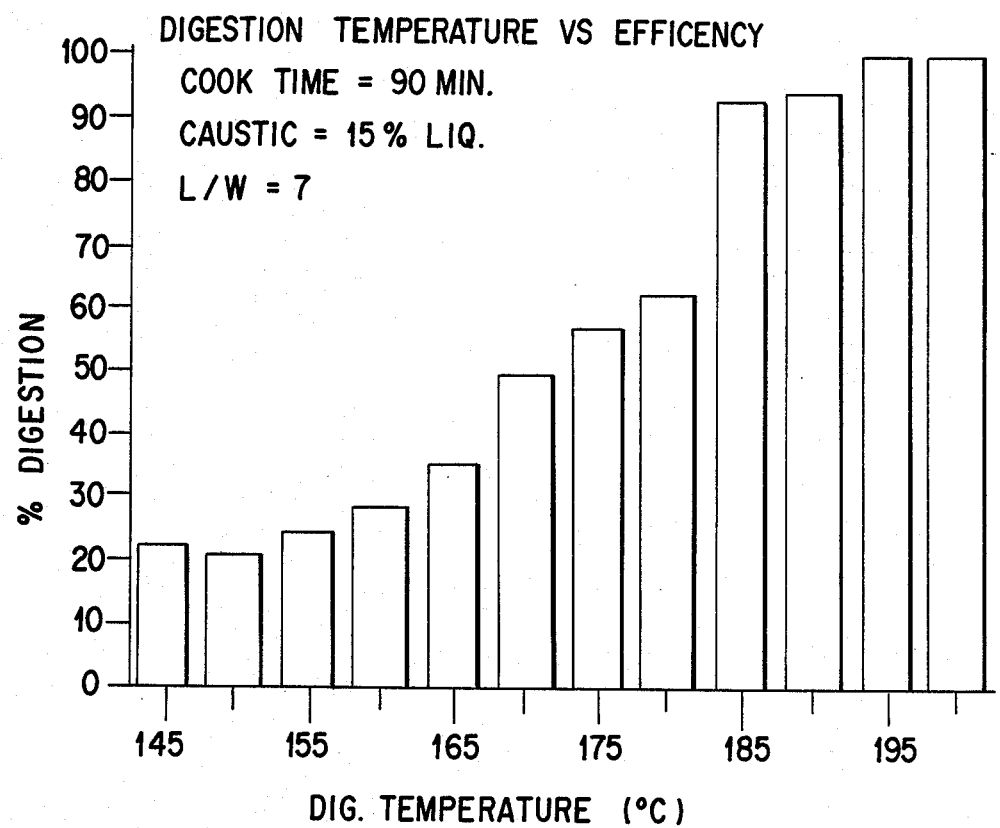
FIG. 4 is a graph showing the effects of increased temperature on the percentage of cellulosic fibers digested at an alkali solution concentration of 15% by weight and an alkali solution to cellulosic fiber ratio of 7:1.

In addition to the importance of the caustic solution to cellulosic fiber ratio and using above atmospheric pressure, experiments were performed to determine the importance of temperature in digestion. The ideal conditions of a caustic solution to cellulosic fiber weight ratio of 7 to 1 as well as a 15% by weight caustic concentration in the caustic solution were used to determine the importance of the cook (digestion) temperature. As shown in FIG. 4, the percentage of digested material began to rise dramatically at about 170° C., and particularly at a temperature of 185° C. where more than 90% of the cellulosic fibers were digested. At 195° C. and 200° C. essentially all of the cellulosic fibers were digested in accordance with the present invention.

Various digestions were performed in accordance with the digestion process described herein to determine the effect of caustic solution to cellulosic fiber weight ratio in terms of liquified cellulosic fiber reactivity (% phenolic hydroxyl). The results are shown in FIG. 5. As shown in FIG. 5, a dramatic increase in liquified fiber reactivity (% phenolic hydroxyl) began at a caustic solution (15% by weight) to cellulosic fiber weight ratio of 5:1, leveling off at a greater than 20% phenolic hydroxyl content at a caustic solution to cellulosic fiber weight ratio of about 7:1.

RESIN MANUFACTURE

The liquified cellulosic fiber-phenol-formaldehyde resin of the present invention is prepared by mixing the liquified cellulosic fiber in caustic solution, particularly aqueous solution, with phenol and formaldehyde at a pH of 8-13 to begin the polymerization reaction. It is understood that caustic or other chemical capable of liberating hydroxyl ions in the solvent, e.g. water, is needed for the resin polymerization reaction, but caustic need not be added to the liquified cellulosic fiber after liquification because of its high pH as recovered. Since the liquified cellulosic fiber is recovered easily in caustic solution from the liquification process, it is generally not necessary to add additional caustic during resin preparation. To achieve the full advantage of the present invention, the caustic should be added or included with the added liquified cellulosic fiber in an amount sufficient to raise the pH of the resin binder reactant mixture to a value of about 9-11. The liquified cellulosic fiber-phenol-formaldehyde resin binder provides unexpected strength, water resistance and dimensional stability when the resin is used as a binder in the manufacture of fibrous articles.

The liquified cellulosic fibers may be relatively pure, as from sawdust or other relatively pure cellulosic fibers, or may contain a substantial quantity of, up to about 80%, impurities. For example, the liquified fiber source may be a cellulosic sludge obtained from wet process consolidated man-made board, e.g. hardboard, manufacture or a liquified cellulosic fiber composition obtained by concentrating the liquified cellulosic fiber composition resulting from liquification of such a sludge. Further, when resins manufactured in accordance with the present invention include a substantial quantity of non-resin impurities added from the liquified cellulosic fiber source, most of the non-functional impurities from the liquified cellulosic fiber source, such as inorganic salts and the like, will be washed out through the mat during board formation when the resins are used in consolidated man-made board manufacture in the wet process. Any minor amount of impurities which are retained in the mat or sheet generally do not present a manufacturing problem and do not cause deterioration of the physical properties of the fibrous article.

In accordance with the method of the present invention, phenol, formaldehyde, water, and zero or a small portion of the liquified cellulosic fiber, in caustic solution, e.g. aqueous solution, are charged to a reactor equipped with a stirrer, thermometer, and condenser, and the mixture is warmed to about 45° C. At this point, some or more of the liquified cellulosic fiber in caustic solution is added in a controlled manner to control the temperature rise to about 1° C. per minute. To achieve the full advantage of the present invention, the condensation is started with little or no alkali in the reaction mixture, and the liquified cellulosic fiber in caustic solution is added incrementally to control the condensation steadily until the desired degree of polymerization is achieved. The reaction is carried out at a pH of about 8.0 to about 12.2, preferably about 9.0 to about 12.0. After the temperature reaches about 90° C. (after about 45 minutes) the temperature of the reaction mixture is held constant for about 1 to 3 hours to achieve a desired degree of polymerization. The proper degree of polymerization has been reached when the viscosity of the reaction mixture reaches about 150 centipoises as measured by a Brookfield viscometer. The mixture is then cooled and diluted to about 20% solids or less to prevent further polymerization.

Figure 6:
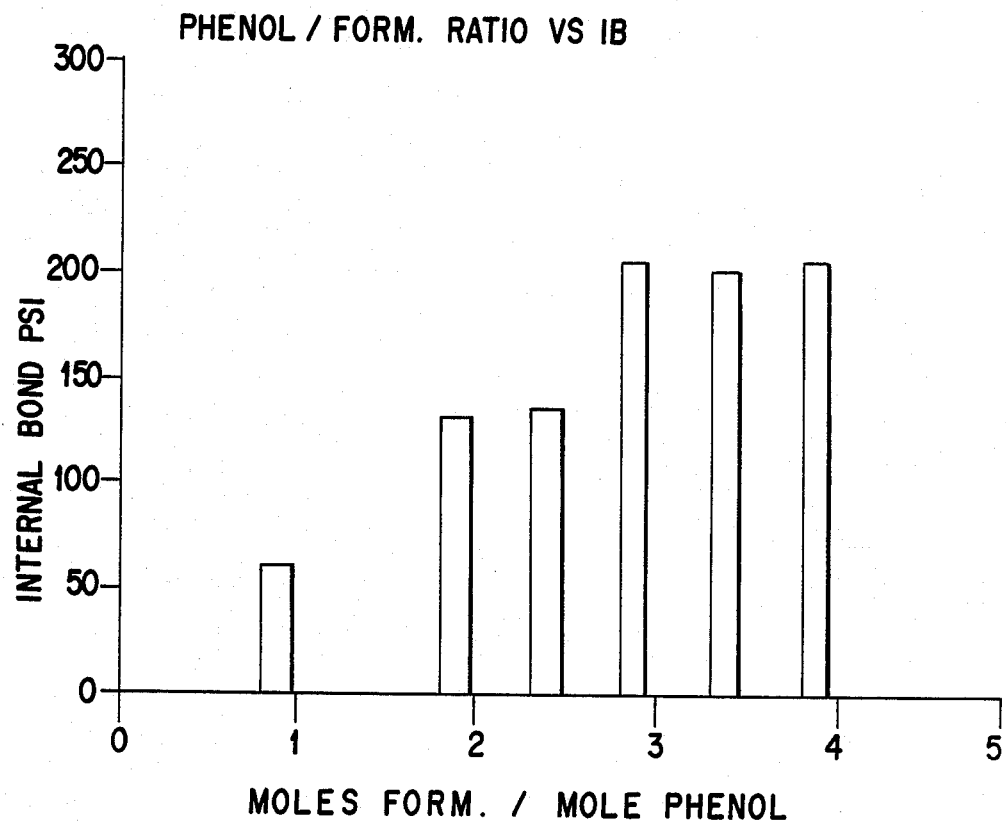
FIG. 6 is a graph showing the strength (internal bond strength) of fiber boards consolidated using binders (2.5% by weight of the dry boards) of liquified cellulosic fiber-phenol-formaldehyde binders (35% phenol substitution) at various molar ratios of formaldehyde to phenol.
Figure 7:
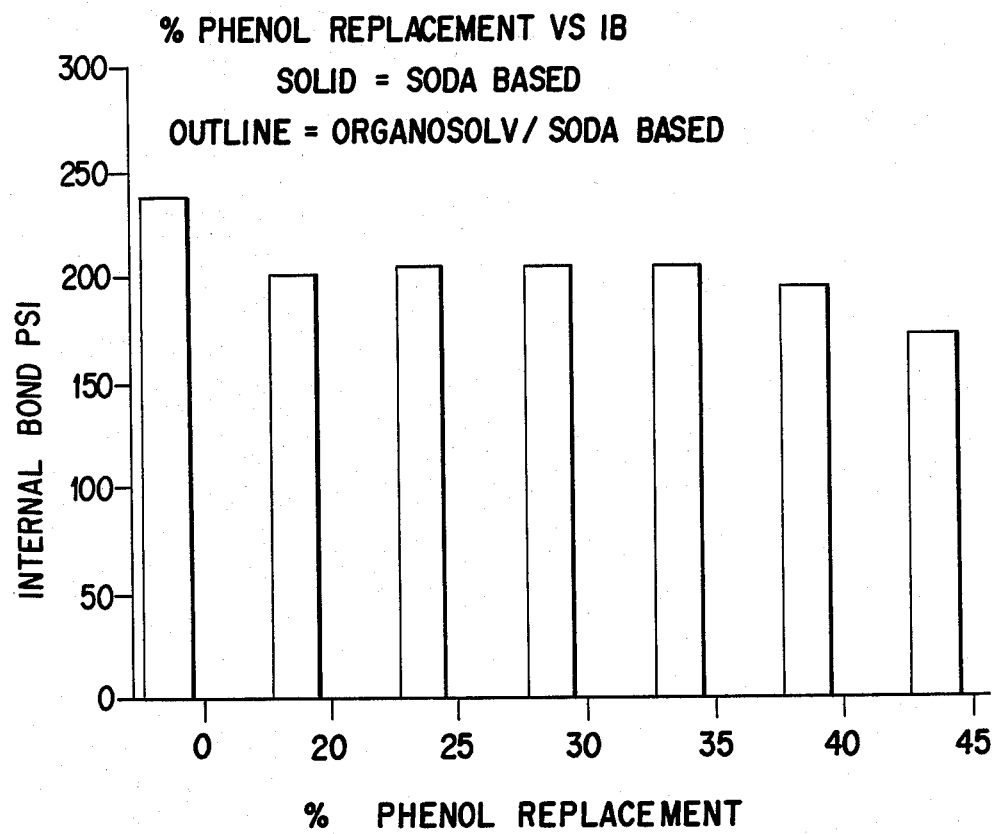
FIG. 7 is a graph showing the strength (internal bond strength) of fiberboards consolidated using binders (2.5% by weight of the dry boards) of liquified cellulosic fiber-phenol-formaldehyde binders at various percentages of substitution of the liquified cellulosic fibers for the phenol.
Figure 8:
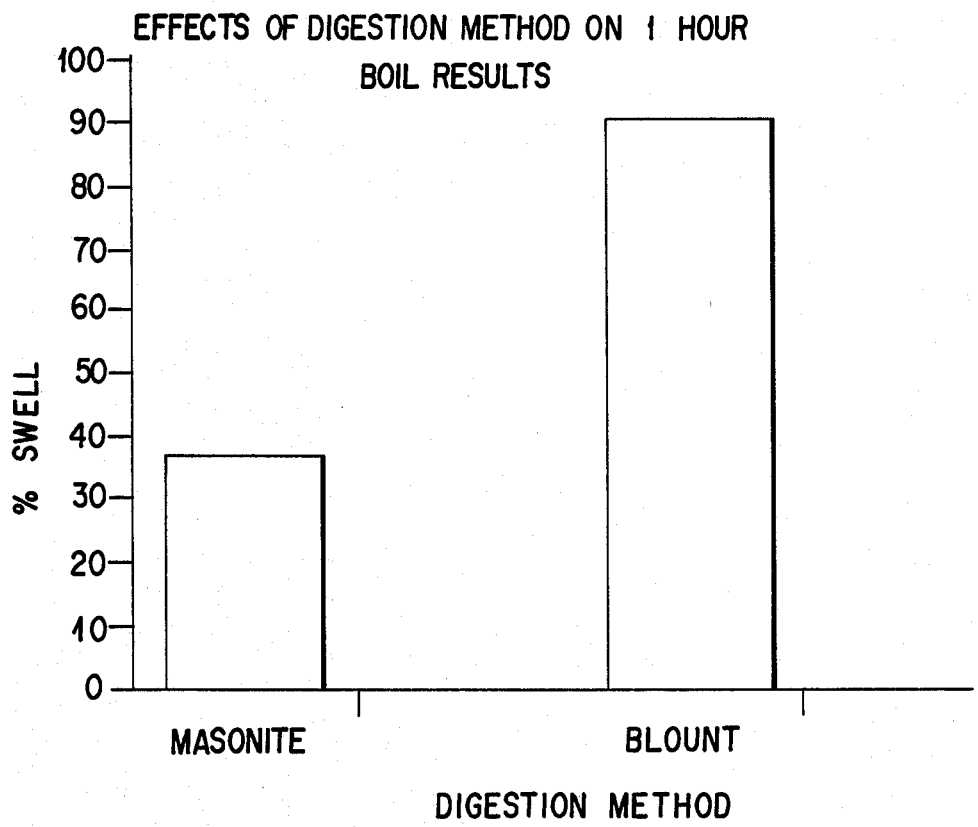
FIG. 8 is a graph comparing the % boil swell of fiberboards made with the liquified cellulosic fiber-phenol-formaldehyde binders of the present invention compared with that of the prior art Blount U.S. Pat. No. 4,226,982.
Figure 9:
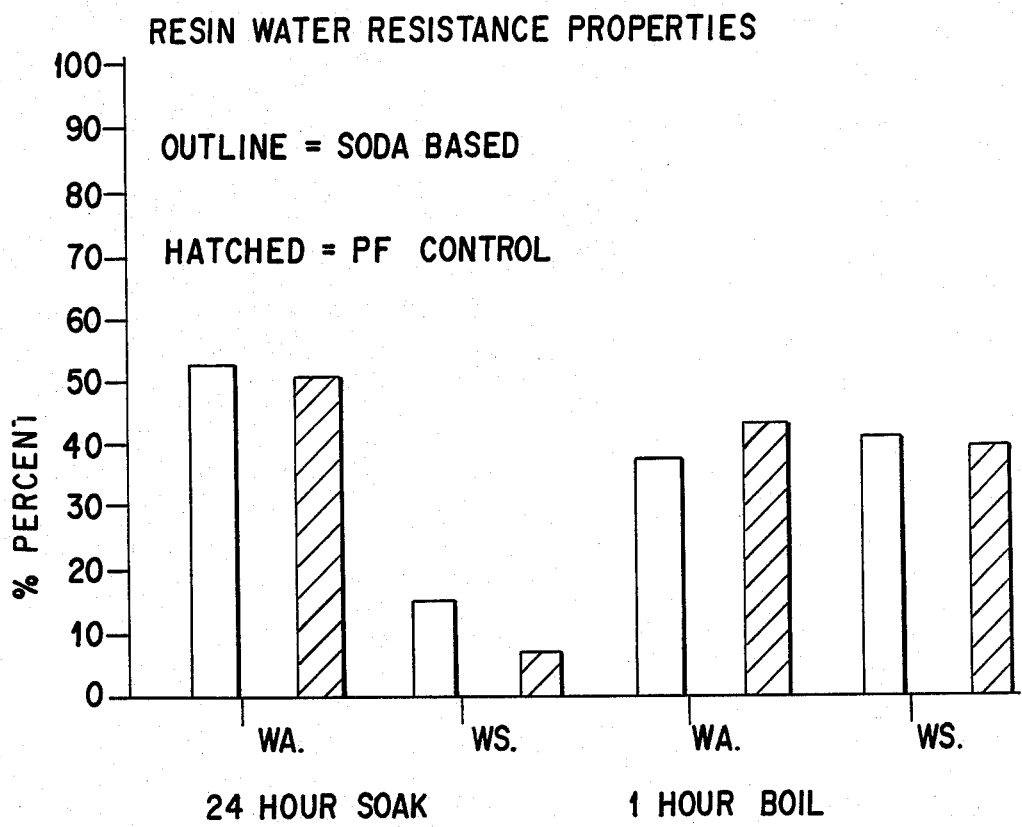
FIG. 9 is a graph showing the water absorption (WA) and water swell (WS) of fiberboards consolidated with the liquified cellulosic fiber-phenolformaldehyde binders of the present invention compared to fiberboards made with a phenol-formaldehyde control binder.

Phenol to formaldehyde ratios of the woody waste resins were varied from 1:1 to 1:4. Internal bond results, as shown in FIG. 6, indicate that a 1:3 ratio is nearly optimal. Similar results were found for 1-hour boil and 24-hour soak tests, as shown in FIGS. 7-9. Caustic catalyst addition was found unnecessary, due to the caustic being added at the woody waste digestion stage. The caustic, which would have been added to the resin as a catalyst, is first used to digest the woody waste and then added back to the resin as the basic digestion product, which acts as the catalyst. Cook times with the caustic serving the dual role of digestion agent and catalyst, for all the phenol to formaldehyde ratios tested, were similar to those used in commercial phenol formaldehyde resin processes.

In accordance with an important feature of the present invention, the phenol:formaldehyde mole ratio in the reaction mixture should be in the range of 1:1 to 1:4 and particularly in the range of 1.2:1 to 3.6:1, especially 3:1. Further, excellent results have been achieved using a hydroxyl ion liberator (caustic) to phenol mole ratio in the reaction mixture in the range of 1.0 to 0.2 and 1.0 to 0.5. The amount of liquified cellulosic fiber (dry basis of solid cellulosic fiber liquified) can vary over a wide range of about 5-80% by total weight of phenol, formaldehyde, and liquified cellulosic fiber in the reaction mixture, with best results at less than about 45% by total weight liquified cellulosic fibers, as shown in FIG. 7.

To achieve the full advantage of the present invention, the percentage by weight of phenol, formaldehyde and liquified cellulosic fiber based on the total weight of the reaction mixture should be in the range of 10-70% and the polymerization reaction should be carried out at a temperature in the range of about 60°-100° C. The most suitable ranges for the digestion variables, as well as the percent phenol used in the resin reaction are shown in Table III:

TABLE III

| EXEMPLARY DIGESTION VARIABLES | | |
|---|---|---|
| DIGESTION VARIABLE | LOW | HIGH |
| Temperature (°C.) | 130 | 200 |
| Time (Minutes) | 20 | 90 |
| Percent Caustic | 2 | 15 |
| Percent Phenol | 5 | 50 |

TABLE III-continued

EXEMPLARY DIGESTION VARIABLES

| DIGESTION VARIABLE | LOW | HIGH |
| --- | --- | --- |
| Catalyst | NO | YES |
| Liquid/Wood | 3 | 7 |

In accordance with the following example 1, a liquified cellulosic fiber-phenol-formaldehyde resin was prepared by substituting 30% of the phenol with a liquified cellulosic fiber.

EXAMPLE 1

| REAGENT | MOLES | DRY GRAMS |
| --- | --- | --- |
| Phenol | 1 | 94.0 |
| Formaldehyde | 3 | 90.0 |
| Liquified Cellulosic Fiber | — | 40.3 |

The above components were charged to a suitable reaction vessel having sufficient cooling capacity to maintain the reaction vessel at 85° C. for 1–5 hours.

The resins made with the liquified cellulosic fibers digested in accordance with the present invention are unexpectedly better as binders than those made with liquified cellulosic fibers digested in accordance with prior art liquification processes, for example the prior art Blount U.S. Pat. No. 4,226,982.

Phenol-formaldehyde resins were manufactured with 35% by weight of the phenol replaced with the digestion products of (1) Blount (Table I) and (2) the liquified cellulosic fiber of the present invention digested in a caustic liquor under pressure (Table I). The liquified fibers were added to phenol in a reaction vessel, formaldehyde was then added, and the reaction heated by the addition of a sodium hydroxide catalyst. The reactions were carried out with all variables held constant and terminated at identical resin viscosities.

The resins prepared as described were used in the manufacture of hardboard as shown in Table IV.

TABLE IV

HARDBOARD MANUFACTURE

| | % based on finished board weight |
| --- | --- |
| Resin | 2.5% |
| PET (wax) | 2.5% |
| Fiber | 8% |
| Specific Gravity | 1.1 g/cm |
| Board size | 12 × 12 in. |
| Oven dry fiber | 411 g. |
| Dry resin | 10.27 g. |
| Press Cycle | Initial Press to 325 psi hold for 10 seconds release press to 275 psi hold for 60 seconds release |

1 hour boil test ASTM standard D 1037–78 Fiber type, press cycle, board density and all other board and process variables were held constant. The effectiveness of the resins was evaluated by standard ASTM one hour boil swell tests, as shown in FIG. 8.

The substantially increased solubility; substantially increased reactivity—as shown by phenolic hydroxyl content; and substantially lower boil swell values of the hardboard containing the resin made with the liquified cellulosic fibers of the present invention are new and unexpected in the art of cellulosic fiber liquification and hardboard manufacture.

Further experiments with the boards containing 2.5% resin manufactured with 35% substitution of the liquified cellulosic fiber of the present invention as a replacement for phenol, as compared to a standard phenol formaldehyde resin showed that the resins of the present invention are almost as good as standard phenol formaldehyde resins in terms of 24 hour soak and one hour boil swell, as shown in FIG. 9 for water absorption (WA), measured as percentage weight gain and water swell (WS), measured as a percentage increase in dimensions.

Figure 10:
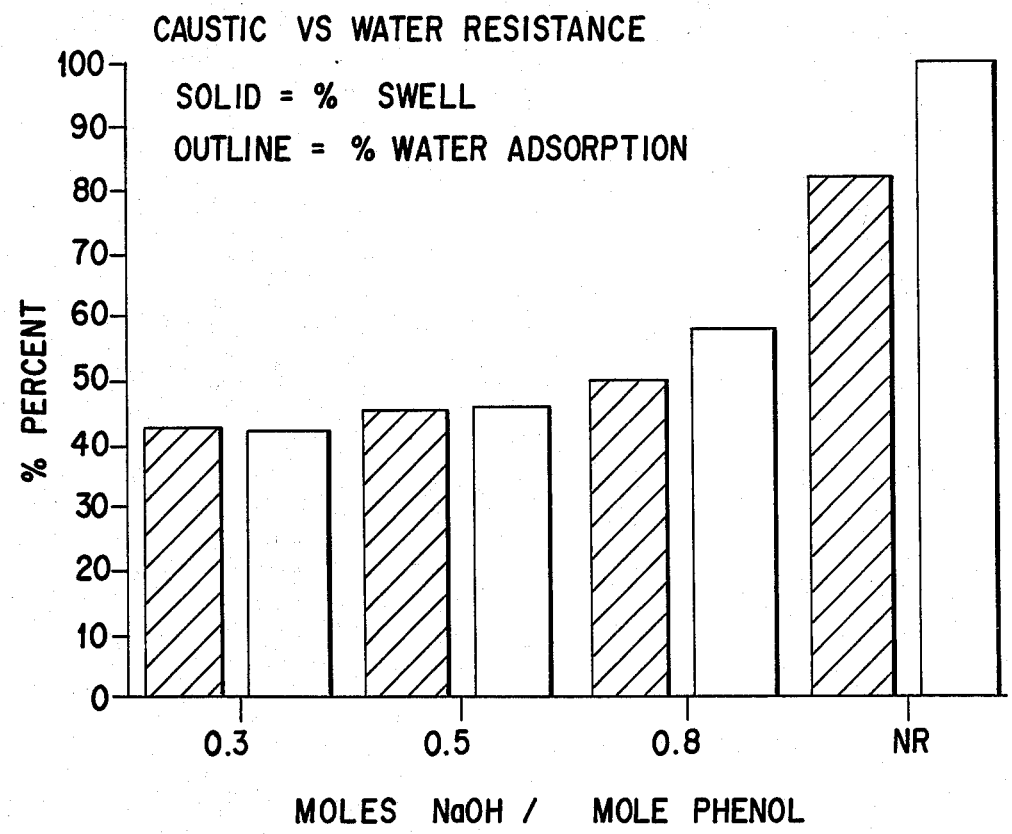
FIG. 10 is a graph showing the effects of various ratios of alkali to phenol on the water swell and water absorption properties of fiberboards consolidated using the liquified cellulosic fiber-phenolformaldehyde binders of the present invention.

Various resins were manufactured using the liquified cellulosic fibers digested in accordance with the present invention with various mole ratios of NaOH to phenol to determine the percentages of water absorption and water swell. As shown in FIG. 10, at NaOH to phenol mole ratios below about 1:1, and particularly at about 0.8 and below, unexpectedly lower water absorption and water swell values are achieved.

In accordance with one important embodiment of the present invention, all of the components except the liquified cellulosic fibers are charged to a reactor equipped with a stirrer, thermometer, and condenser. The components are mixed and warmed to 45° C. At this time, liquified cellulosic fiber in aqueous caustic solution is added in such a manner as to control the temperature rise to about 1° C. per minute. After the temperature reaches 90° C. (about 45 minutes), the temperature is held constant for 2 hours until the viscosity of the resin mixture reaches about 10 to about 5000 centipoises, particularly about 100–1000 centipoises.

In accordance with one embodiment of the present invention the phenol can be added to the liquified cellulosic fibers prior to controlled addition to the formaldehyde to achieve reaction temperature without additional heating.

It has been found that the resins of the present invention generally should have a viscosity in the range of about 10 to about 5000 centipoises, particularly 100–1000 centipoises when used to bind discrete solid particles, such as in the manufacture of plywood, oriented strand board and waferboard. To achieve the full advantage of the present invention for resins manufactured in accordance with the present invention when used in laminating sheet material, such as plywood, or when used to bind discrete solid masses, such as in the manufacture of oriented strand board or particle board, the resins should have a viscosity in the range of about 100 to about 800 centiposes. The mixture is then cooled and diluted to 20 percent solids.

In accordance with an important feature of the present invention, polymerization should be terminated when the reaction mixture reaches a viscosity in the range of about 10 centipoises to about 5000 centipoises when measured at a pH of about 10.3. Resins polymerized in accordance with the present invention to a viscosity in the range of about 10 centipoises to about 5000 centipoises will provide new and unexpected bonding between fibers; fibrous particles; sheet materials, particularly fibrous sheet materials such as wood veneers laminated to manufacture plywood; and masses of uniformly or randomly shaped discrete members such as wood sheet portions or strips bonded in the manufacture of sheet materials such as oriented strand board and waferboard. The lower viscosities, e.g. 10 to 500 centipoises, particularly 100 to 200 centipoises, are preferrable for use as binders in initial consolidation of individual fibers or smaller discrete pieces, such as in the initial consolidation of fiber in the manufacture of fiberboard, particle board and insulation board. The higher viscosity resins, e.g. 250 to 1500 centipoises are most appropriate for binding together a plurality of discrete masses or sheet material, such as in the manufacture of plywood, oriented strand board, and waferboard. When the resins of the present invention are used in the wet process to manufacture fiberboard or other water-laid fibrous sheets, e.g. resins having a viscosity of about 10 to about 500 centipoises, they will precipitate out of forming water, having a pH of about 5 or less, onto the fibers to provide new and unexpected bonding strength and bonding maintenance as evidenced by the internal bond, modulus of rupture and boil swell data set forth in Table V.

To achieve the full advantage of the present invention when the resins are used to bond discrete masses, particularly fibrous masses, such as in the manufacture of plywood, oriented strand board and waferboard, polymerization should be terminated when the reaction mixture reaches a viscosity in the range of about 200 centipoises to about 3500 centipoises, measured at a pH of 10.3. Resins of the present invention prepared by terminating polymerization at a viscosity of about 10 to about 600 centipoises, and preferably about 20 to about 150 centipoises have provided new and unexpected bonding when used as a binder in the initial formation or consolidation of fibrous products, such as fiberboard, and insulation board.

Polymerization can be terminated in any manner, such as by cooling the reaction mixture to about room temperature and diluting the mixture to about 20% solids, as set forth in Example 1. Dilution to about 10% to about 30% solids slows resin aging by slowing further polymerization to lengthen resin shelf life to at least about 1 month at room temperature.

The resin of example 1 was then compared to a typical phenol-formaldehyde resin in the manufacture of a fiberboard using typical binder incorporation levels of 3/4% and 1%. It was found that the fiberboard manufactured with the resin binder of the present invention has new and unexpectedly low boil swell values as indicated by the test data set forth in Table V.

change in caliper of the sample and expressing the result as a percentage of expansion. The smaller boil values indicate superior performance. The modulus of rupture data were collected in accordance with ASTM-1037.

BONDING OF A PLURALITY OF DISCRETE MASSES, PARTICULARLY, FIBROUS MASSES, SUCH AS IN THE MANUFACTURE OF LAMINATES, E.G. PLYWOOD, ORIENTED STRAND BOARD AND WAFERBOARD

The liquified cellulosic fiber-phenol-formaldehyde resins of the present invention generally are useful as binders in any environment where phenol formaldehyde binding resins have been used. Examples of such uses include the manufacture of laminates, such as in the manufacture of plywood, and in the bonding together of discrete uniformly or randomly shaped members, particularly fibrous members, such as in the manufacture of chip board, particle board, oriented strand board and waferboard. In the manufacture of such products, the binding resin is disposed between closely adjacent discrete pieces, particles or members to securely bond the discrete particles or members by sandwiching a layer or area of binder between the two closely adjacent particles or members. Some products, such as chip board, particle board and oriented strand board are manufactured by completely coating the discrete particles or members to be adhered together with a layer of wet, viscous, i.e. 300 cps, resin binder and pressing or molding the members into a desired shape under heat and pressure to cure the binder while pressing the adjacent particles or members into close contact.

In the manufacture of waferboard, the binder is used in a dry or powder form sporatically over the wafers or fibrous pieces, instead of providing a complete coating, to provide distinct areas of bonding between closely adjacent members, similar to spot welds in metal. The manufacture of fibrous sheet materials from smaller fibrous portions such as chip board, particle board, oriented strand board and waferboard is becoming increasingly important with the dwindling supply of trees suitable for peeling into continuous sheets, e.g. wood veneer as used in making plywood. The resins of the present invention are useful in the same manner and generally in the same amounts as phenol formaldehyde

TABLE V

| Resin | One Hour Boil Range | Swell Avg. | Modulus of Rupture Range | Rupture Avg. | Internal Bond Range | (psi) Avg. | #of Duplicates |
|---|---|---|---|---|---|---|---|
| Phenol Formaldehyde (control) | 65.04–72.66 | 68.85 | 3064–3522 | 3293 | 115–125 | 120 | 4 |
| 50% liquified fiber | 49.48–62.08 | 55.78 | 2975–3483 | 3229 | 120–137 | 129 | 7 |
| 75% liquified fiber | 55.02–74.29 | 64.66 | 2866–3130 | 2998 | 75–97 | 86 | 4 |
| 75% liquified fiber from redwood sawdust | 56.10–65.78 | 62.74 | 2656–3423 | 3070 | 93–128 | 108 | 4 |
| 90% liquified | 51.29–69.01 | 60.15 | 2851–3563 | 3207 | 90–111 | 101 | 4 |

The boards tested were pressed at 400° F. and 400 psig for 1.5 minutes and the pressure reduced to 100 psi. Each board included 1% by weight of the above resin.

The above data clearly shows superior properties at a lower rate of resin usage in typical fiberboard manufacture using the liquified cellulosic fiber-phenol-formaldehyde resin of the present invention compared to a conventional phenol-formaldehyde resin.

The one hour boil test data were collected by boiling a 1×12 inch test sample for one hour, measuring the binding resins in manufacturing sheet materials such as particle board, oriented strand board, waferboard, and plywood as well as in binding together individual fibers as in the manufacture of fiberboards such as hardboard and insulation board (wet and dry process); fiberglass woven and non-woven mats and the like.

PLYWOOD MANUFACTURE

Plywood is manufactured by peeling a tree into a long veneer, for example Southern Pine or Douglas fir, cutting the veneer to a given dimension, i.e. 4 ft by 8 ft, and laminating a plurality of the cut veneers, under pressure, with one or more intermediate layers of a binder, e.g. a phenol formaldehyde glue formulation. The adjacent veneers of plywood are oriented so that the fiber grain direction of alternate veneers are at right angles when laminated together. The glue formulation, including a resin having a viscosity of about 300 centipoises is spread between adjacent plywood veneers at a rate of about 20 grams/ft$^2$ where the glue formulation includes about one third by weight resin and the remainder comprises water, extenders, fillers and the like to achieve a suitable glue formulation. Industry standards require plywood to achieve a value of at least 80 when tested for lap shear, measured as a percent wood failure.

The resins of the present invention are useful for manufacture of plywood, oriented strand board and waferboard, as described above, as well as in any other environment where resin binders or adhesives are used.

ORIENTED STRAND BOARD (OSB) MANUFACTURE

Oriented strand board (OSB) is manufactured from a plurality of discrete generally oriented strands or strips of wood hot pressed together using a binder, such as a phenol formaldehyde resin. The pieces or strips of wood are, for example, plywood or veneer strips having a width of abot ¼ inch to ⅜ inch, a length of about 2 ½ inches to about 3 inches and a thickness of about 20 mils. The strips of wood are coated, such as by spraying, with a liquid resin glue and generally oriented so that the fiber direction is approximately the same. The resin coated, oriented strips are disposed into a press or mold so that the strips are in contact with other strips both vertically and horizontally so that when pressed, under heat and pressure, the strips are compressed tightly against other contacting strips to adhere the strips togehter and to mold a sheet of material having desired dimensions. The strands or strips of wood material are not perfectly aligned in one fiber direction (approximately ±20° from a single direction) so that some strips overlap other adjacent strips for stronger adhesion.

Oriented strand board is manufactured having the fibers generally oriented in a length or machine direction or manufactured having the fibers generally oriented in the width or cross-machine direction. Other oriented strand boards are manufactured having a central or core layer including about 50% by weight of the fibers generally oriented in a width or crossmachine direction and having upper and lower layers (each about 25% by weight of total board fibers) generally oriented in a length or machine direction. The resin coated strands having fibers generally aligned in a single direction or having multiple layers of resin coated strands where adjacent layers have fibers aligned generally at a right angle, are hot pressed to form a sheet of predetermined dimensions. Industry standards require that oriented strand boards achieve given values for modulus of rupture (both parallel to and perpendicular to orientation); modulus of elasticity (both parallel to and perpendicular to orientation); and internal bond.

WAFERBOARD MANUFACTURE

Waferboard construction is similar to oriented strand board construction in that a number of discrete fibrous pieces or members, having a thickness of about 20 mils, are adhered together under heat and pressure to form a sheet material having predetermined dimensions. Waferboard, however, is manufactured using wood portions (wafers) having approximately square dimensions (e.g. 2 inch to 2.5 inch squares). No attempt is made to orient the fiber direction when making waferboard. Further, the resin binder (e.g. phenol formaldehyde) is applied in a dry powder form since attempts to completely cover the wafers with a liquid resin have not been effective or have resulted in wafer breakage. Generally, the powdered resin is adhered to the fibrous wafer pieces by first wetting the wafers, such as with a liquid sizing agent, and then contacting the wafers with the dry resin to apply resin discontinuously at a plurality of surface areas on each wafer. When the wafers are hot pressed together, the points or areas of resin adherence act similarly to spot welds to strongly adhere the wafers together and form a sheet material having predetermined dimensions. Industry standards require that waferboard have an internal bond of at least 70 psig; a modulus of rupture of at least 500 psig and a modulus of elasticity of at least 800,000.

The resins of the present inverition are useful for manufacture of plywood, oriented strand board and waferboard, as described above, as well as in any other environment where resin binders or adhesives are used.

To achieve the full advantage of the present invention the resins, when used in liquid form in a binding formulation to adhere together discrete smaller objects, generally are reacted to an extent to achieve a resin having a viscosity in the range of about 200 to about 3500 centipoises. To achieve the fullest advantage of the present invention, the resin binder formulation should have a viscosity in the range of about 250 centipoises to about 1500 centipoises, when used to bind together discrete solid masses, such as in the manufacture of plywood oriented strand board and waferboard.

Although the present invention has been described with reference to a single illustrated embodiment thereof, it should be understood that numerous other modifications and embodiments can be made by those skilled in the art that will fall within the spirit and scope of the principles of this invention.

What is claimed as new and is desired to be secured by Letters Patent is:

1. A method of liquifying cellulosic fibers comprising heating a mixture of cellulosic fibers in an alkali solution having an alkali concentration of at least 2% by weight at a temperature of at least 140° C. and a pressure of at least 150 psi, wherein the weight ratio of alkali solution to cellulosic fibers is at least 4:1, for a time sufficient to liquify the cellulosic fibers.

2. The method of claim 1 wherein the mixture is heated at a temperature of at least 180° C.; wherein the alkali concentration of the alkali solution is at least 8% by weight; wherein the weight ratio of alkali solution to cellulosic fibers is at least 5:1, and wherein the mixture is heated under said conditions for at least 5 minutes.

3. The method of claim 2 wherein the mixture is heated at a temperature of 180° C. to 220° C.; wherein the alkali concentration of the alkali solution is 8% to 15% by weight; wherein the weight ratio alkali solution to cellulosic fibers is 5:1 to 15:1, and wherein the mixture is heated under said conditions for 5 to 90 minutes.

4. The method of claim 2 wherein the mixture is heated at a temperature of at least 190° C.; wherein the alkali concentration of the alkali solution is at least 10% by weight; wherein the weight ratio of alkali solution to cellulosic fibers is at least 6:1, and wherein the mixture is heated for a time sufficient to liquify at least 80% by weight of the cellulosic fibers.

5. The method of claim 2 wherein the mixture is heated at a temperature of at least 190° C.; wherein the alkali concentration of the alkali solution is about 10% to 15% by weight; wherein the mixture is heated at a pressure of 150 psi to 350 psi; wherein the weight ratio of alkali solution to cellulosic fibers is at least 7:1; and wherein the mixture is heated for a time sufficient to liquify at least 90% by weight of the cellulosic fibers.

6. The method of claim 5 wherein the mixture is heated at a temperature of at least 195° C. for a time sufficient to liquify at least 95% by weight of the cellulosic fibers.

7. The method of claim 6 wherein the mixture is heated for a time sufficient to liquify at least 98% by weight of the cellulosic fibers.

8. The method of claim 1 wherein the mixture is heated at a temperature of 140° C. to 200° C. and wherein the weight ratio of alkali solution to cellulosic fibers is in the range of 5:1 to 9:1.

9. The method of claim 2 wherein the alkali solution is an aqueous alkali solution.

10. The method of claim 9 wherein the mixture is heated at a temperature of at least 180° C.; wherein the alkali concentration of the aqueous alkali solution is at least 8% by weight; and wherein the weight ratio of the aqueous alkali solution to cellulosic fibers is at least 6:1.

11. A method of manufacturing a liquified cellulosic fiber-phenol-formaldehyde resin comprising
liquifying cellulosic fibers by heating a mixture of cellulosic fibers in an alkali solution at a temperature of at least 100° C. and at above atmospheric pressure and an alkali concentration sufficient to liquify said cellulosic fibers to form liquified cellulosic fiber;, and
heating said liquified cellulosic fibers with phenol, formaldehyde, and caustic solution to form said liquified cellulosic fiber-phenol-formaldehyde resin wherein said liquified cellulosic fibers comprises about 5 to about 80 percent of the total weight of phenol, formaldehyde and liquified cellulosic fiber.

12. The method of claim 11 wherein said liquified cellulosic fiber-phenol-formaldehyde mixture is heated at a temperature of 60° C. to 100° C. and at a pH of 8–13 to form said polymer.

13. The method of claim 11 wherein said phenol, formaldehyde and liquified cellulosic fiber are mixed prior to heating.

14. The method of claim 11 wherein said liquified cellulosic fiber comprises about 30% to about 60% by total weight of the mixture of liquified cellulosic fber, phenol and formaldehyde.

15. The method of claim 11 wherein the caustic solution is an aqueous caustic solution and wherein the caustic solution to cellulosic fiber ratio is at least 4 to 1.

16. A method of manufacturing a man-made board comprising contacting a plurality of fibers with a liquified cellulosic fiber-phenol-formaldehyde resin and hot pressing said resin contacted fibers together to cause said fibers to adhere to each other in a desired configuration, wherein said resin is formed by heating cellulosic fibers in caustic solution at a temperature of at least 100° C. and a pressure of at least 150 psi and at a caustic concentration sufficient to liquify said cellulosic fibers, and heating a mixture of said liquified cellulosic fiber with phenol and formaldehyde to form said resin.

17. The method of claim 16 wherein said liquified cellulosic fiber-phenol-formaldehyde mixture is heated at a pH of 8–13 for a period of time sufficient that said resin has a viscosity in the range of 10 to 5000 centipoises and then retarding further polymerization.

18. A method of molding a fibrous object having a predetermined configuration comprising disposing a fiber-resin composition in a mold cavity, closing said mold cavity and applying heat and pressure to said composition to adhere said composition together into said predetermined configuration, wherein said fiber-resin composition comprises a plurality of fibers and a liquified cellulosic fiber-phenol-formaldehyde resin formaldehyde resin formed by reacting a resin mixture of liquified cellulosic fiber, phenol, formaldehyde and caustic, wherein said liquidfied cellulosic fibers are formed by heating a mixture of cellulosic fibers in an alkali solution at a sufficiently elevated temperature, above atomspheric pressure and sufficient alkali concentration to liquify the cellulosic fibers.

19. The method of claim 18 wherein said liquified cellulosic fiber comprises about 50% to about 80% by total weight of liquified cellulosic fiber, phenol and formaldehyde in said resin mixture.

20. The method of claim 19 wherein said liquified cellulosic fiber comprises about 40% to about 60% by total weight of liquified cellulosic fiber, phenol and formaldehyde in said resin mixture.

21. The method of claim 18 including heating said resin mixture at a temperature of about 85° to about 95° C.

22. An article of manufacture comprising a plurality of fibers adhered together under heat and pressure with a liquified cellulosic fiber modified phenol-formaldehyde resin wherein said resin is formed by mixing a resin mixture of liquified cellulosic fiber with phenol, formaldehyde and an alkali to form a reaction mixture and polymerizing said mixture, wherein said liquified cellulosic fibers are formed by heating a mixture of cellulosic fibers in an alkali solution at a sufficiently elevated temperature, above atmospheric pressure and sufficient alkali concentration to liquify the cellulosic fibers.

23. The article of claim 22 wherein said liquified cellulosic fiber comprises about 30% to about 60% by total weight of liquified cellulosic fiber, phenol and formaldehyde in said resin mixture.

24. The article of claim 22 wherein said liquified cellulosic fiber comprises about 40% to about 50% by total weight of liquified cellulosic fiber, phenol and formaldehyde in said resin mixture.

25. The article of claim 22 wherein said cellulosic fibers are wood fibers.

26. A liquified cellulosic fiber modified phenol-formaldehyde resin formed by
heating a mixture of phenol, formaldehyde, a liquified cellulosic fiber and alkali wherien said liquified cellulosic fiber comprises about 5 to about 80 percent of the total weight of phenol, formaldehyde and liquified cellulosic fiber; and wherein said liquified cellulosic fibers are formed by heating a mixture of cellulosic fibers in an alkali solution at a sufficiently elevated temperature, above atmospheric pressure and sufficient alkali concentration to liquify the cellulosic fibers;

polymerizing said mixture at a temperature of 60° C. to 100° C. to form a liquified cellulosic fiber modified phenol-formaldehyde resin; and retarding polymerization of said reaction mixture when the viscosity reaches 10 to 4000 centipoises.

27. The resin of claim 26 wherein the reaction mixture is diluted to 10 to 30% solids after the viscosity of the reaction mixture reaches 10 to 150 centipoises to prevent further polymerization.

28. The resin of claim 27 wherein the reaction mixture is diluted with water.

29. A method of manufacturing a sheet material formed from a plurality of discrete members adhered together, including contacting a plurality of discrete sheet material members with a binding resin; disposing each of said sheet material members in contact with at least one other of said sheet material members and pressing said sheet material members together with sufficient heat and pressure to form a consolidated sheet material, the improvement comprising said binding resin, wherein said resin is formed by mixing a liquified cellulosic fiber, formed by heating cellulosic fibers in caustic solution at a temperature of at least 100° C. and a pressure of at least 150 psi and at a caustic concentration sufficient to liquify said cellulosic phenol fibers; formaldehyde; and an alkali to form a reaction mixture and polymerizing said mixture.

30. The method of claim 29 wherein said liquified cellulosic fibers comprises about 30% to about 60% by total weight of liquified cellulosic fibers, phenol and formaldehyde in said reaction mixture.

31. The method of claim 29 wherein said liquified cellulosic fibers comprises about 40% to about 50% by total weight of liquified cellulosic fiber, phenol and formaldehyde in said resin mixture.

32. The method of claim 29 wherein said discrete members include cellulosic fibers.

33. The method of claim 29 wherein said discrete members comprise discrete wood pieces.

34. The method of claim 29 wherein said discrete members comprise resin bound fiberglass pieces.

35. A method of manufacturing a sheet material formed from a plurality of discrete members adhered together, including contacting a plurality of discrete sheet material members with a binding resin; disposing each of said sheet material members in contact with at least one other of said sheet material members and pressing said sheet material members together with sufficient heat and pressure to form a sheet material, the improvement comprising said binding resin, wherein said resin is formed by polymerizing a mixture of phenol, formaldehyde, and liquified cellulosic fiber wherein said liquified cellulosic fiber is formed by heating cellulosic fibers in caustic solution at a temperature of at least 100° C. and a pressure of at least 150 psi and at a caustic concentration sufficient to liquify said cellulosic fibers, and comprises about 5 to about 80 percent of the total weight of phenol, formaldehyde and liquified cellulosic fiber and wherein said liquified cellulosic fiber is mixed with said phenol and formaldehyde under alkaline conditions.

36. The method of claim 35 wherein the reaction mixture is diluted to 10 to 30% solids after the viscosity of the reaction mixture reaches 10 to 4000 centipoises to prevent further polymerization.

37. A method of manufacturing a cohesive article of a desired configuration comprising contacting a plurality of fibers with a liquified cellulosic fiber modified phenol-formaldehyde resin and hot pressing said resin contacted fibers together to cause said fibers to adhere to each other, wherein said resin is formed by heating cellulosic fibers at a temperature of at least 100° C. and a pressure of at least 150 psi with an alkali solution to substantially liquify said cellulosic fibers, and polymerizing a mixture of said liquified cellulosic fibers, phenol and formaldehyde, under alkaline conditions.

38. The method of claim 37 wherein said mixture is polymerized at a pH of 8-13 for a period of time sufficient that said polymer has a viscosity in the range of 10 to 4000 centipoises.

39. A method of molding an object having a predetermined configuration from a plurality of smaller objects comprising disposing an object-resin composition in a mold cavity, closing said mold cavity and pressing said composition to adhere said composition together into said predetermined configuration, wherein said object-resin composition comprises a plurality of said smaller objects and a liquified cellulosic fiber modified phenol-formaldehyde resin formed by mixing a liquified cellulosic fiber, phenol and formaldehyde to form a reaction mixture, while adding said liquified cellulosic fiber incrementally to control the temperature rise of the mixture during reaction to thereby polymerizing said mixture, wherein said liquified cellulosic fibers are formed by heating a mixture of cellulosic fibers in an alkali solution at a sufficiently elevated temperature, above atmospheric pressure and sufficient alkali concentration to liquify the cellulosic fibers.

40. A method of manufacturing a solid article comprising a plurality of solid members bound with a liquified cellulosic fiber modified phenolformaldehyde polymer comprising:

polymerizing a mixture of phenol, formaldehyde, liquified cellulosic fiber and alkali wherein said liquified cellulosic fiber is formed by heating cellulosic fibers in caustic solution at a temperature of at least 100° C. and a pressure of at least 150 psi and at a caustic concentration sufficient to liquify said cellulosic fibers, and comprises about 5 to about 80 percent of the total weight of phenol, formaldehyde and liquified cellulosic fiber and wherein said liquified cellulosic fiber is mixed with said phenol and formaldehyde under alkaline conditions before substantial reaction between said phenol and said formaldehyde;

reacting said mixture to form a liquified cellulosic fiber modified phenol-formaldehyde polymer;

coating at least a portion of said solid members with said polymer; and pressing said solid members together under conditions to adhere said solid members together with said polymer and thereby manufacture said solid article.

41. The method of claim 40 wherein said mixture is polymerized at a temperature of 60° C. to 100° C. and at a pH of 8-13 to form said polymer.

42. A method of manufacturing a plywood article including applying a binder comprising a polymer between two layers of wood and pressing said wood layers together under conditions sufficient to adhere said layers together, the improvement comprising said polymer wherein said polymer is formed by polymerizing a mixture of liquified cellulosic fiber, formed by heating cellulosic fibers in caustic solution at a temperature of at least 100° C. and a pressure of at least 150 psi and at a caustic concentration sufficient to liquify said cellulosic fibers; phenol; and formaldehyde, under alkaline conditions.

43. A plywood article manufactured by applying a binder comprising a polymer between two layers of wood and pressing said wood layers together under conditions sufficient to adhere said layers together, the improvement comprising said polymer wherein said polymer is formed by heating a mixture of liquified cellulosic fiber, phenol and formaldehyde, under alkaline conditions, wherein said liquified cellulosic fibers are formed by heating a mixture of cellulosic fibers in an alkali solution at a sufficiently elevated temperature, above atomospheric pressure and sufficient alkali concentration to liquify the cellulosic fibers.

44. A method of manufacturing an oriented strand board including at least partially coating a plurality of wood fiber strand members with a polymeric binder; disposing said coated strand members in contact with at least one other of said strand members; and pressing said wood fiber strand members to adhere said strand members together; the improvement comprising said polymeric binder wherein said polymer is formed by polymerizing a mixture of liquified cellulosic fiber, formed by heating cellulosic fibers in caustic solution at a temperature of at least 100° C. and a pressure of at least 150 psi and at a caustic concentration sufficient to liquify said cellulosic fibers, phenol, and formaldehyde, under alkaline conditions.

45. An oriented strand board manufactured by at least partially coating a plurality of wood fiber strand members with a polymeric binder; disposing said coated strand members in contact with at least one other of said strand members; and pressing said wood fiber strand members to adhere said strand members together; the improvement comprising said polymeric binder wherein said polymer is formed by polymerizing a mixture of liquified cellulosic fiber, phenol and formaldehyde, under alkaline conditions, wherein said liquified cellulosic fibers are formed by heating a mixture of cellulosic fibers in an alkali solution at a sufficiently elevated temperature, above atomospheric pressure and sufficient alkali concentration to liquify the cellulosic fibers.

46. A method of manufacturing a waferboard including binding togeter a plurality of discrete, relatively thin wood pieces with a polymer binder under pressure sufficient to adhere said wood pieces together into sheet form, the improvement comprising the polymer binder wherein said polymer is formed by polymerizing a mixture of liquified cellulosic fiber, formed by heating cellulosic fibers in caustic solution at a temperature of at least 100° C. and a pressure of at least 150 psi and at a caustic concentration sufficient to liquify said cellulosic fibers; phenol; and formaldehyde, under alkaline conditions. together into sheet form, the improvement comprising the polymer binder wherein said polymer is formed by polymerizing a mixture of liquified cellulosic fiber, phenol and formaldehyde, under alkaline conditions.

47. The method of claim 46 including applying said polymer binder to said wood pieces as a powder having a moisture content of less than about 15% by weight.

48. A waferboard manufactured by binding together a plurality of discrete, relatively thin wood pieces with a polymer binder under pressure sufficient to adhere said wood pieces together into sheet form, the improvement comprising the polymer binder wherein said polymer is formed by reacting a mixture of liquified cellulosic fibers, phenol and formaldehyde, under alkaline conditions, said liquified cellulosic fibers formed by heating cellulosic fibers in caustic solution at a temperature of at least 100° C. and a pressure of at least 150 psi and at a caustic concentration sufficient to liquify said cellulosic fibers.

* * * * *